Oct. 29, 1963 F. DACHERT 3,109,152

MICROWAVE PHASE-SHIFT DEVICES

Filed May 2, 1961 2 Sheets-Sheet 1

United States Patent Office 3,109,152
Patented Oct. 29, 1963

3,109,152

MICROWAVE PHASE-SHIFT DEVICES

Francois Dachert, Paris, France, assignor to Compagnie Generale de Telegraphie Sans Fil, a corporation of France

Filed May 2, 1961, Ser. No. 107,237
Claims priority, application France May 3, 1960
2 Claims. (Cl. 333—31)

The present invention relates to rapidly operating microwave phase-shift devices.

It is an object of the invention to provide an improved phase-shift device capable of operating within a time interval of the order of less than one micro-second.

According to the present invention there is provided a phase shifting device for high frequency transmission lines comprising at least one diode connected as an obstacle in said line; means for applying a direct current voltage to said diode for biasing the same in the reverse direction and means for applying in series with said biasing voltage a control voltage for controlling the phase-shift introduced by said diode, the sum of said two voltages being always such that the diode is always biased in the reverse direction.

Preferably, a system according to the invention, includes two diodes and a passive obstacle, which results in a reduction of the standing-wave ratio within a given phase-shift range.

For a better understanding of the invention and to show how the same may be carried into effect, reference will be made to the accompanying drawing wherein.

Figure 1:
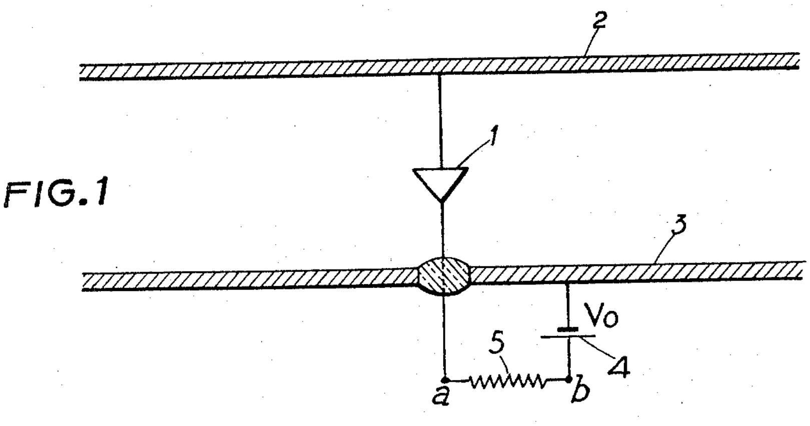
FIG. 1 shows a first embodiment of a phase-shift arrangement according to the invention.

The arrangement shown in FIG. 1 comprises a diode 1, which may be of the point contact or the junction type, having a capacity of about 2 to 4 $\mu\mu$f., and is coupled between parallel walls 2 and 3 of a waveguide. A biasing voltage source 4 provides a potential $V_0$ and is connected to feed an inverse current to diode 1. The control voltage $V_c$ appearing across terminals *a* and *b* of a resistor 5 is connected in series with the bias voltage source.

The values of voltages $V_0$ and $V_c$ are such that there is never any current flowing in the forward direction in the diode. Under these conditions, the diode behaves as a purely capacitive shunt impedance, having a capacity C equal to $$C=C_0/\sqrt{(1-V/V_1)}$$

where $C_0$ and $V_1$ are constants, and V is equal to $$V=V_c+V_0$$

The corresponding impedance Z is:

$$-j/C\omega=-j(\sqrt{(1-V/V_1)}/C_0\omega)$$

Figure 2:
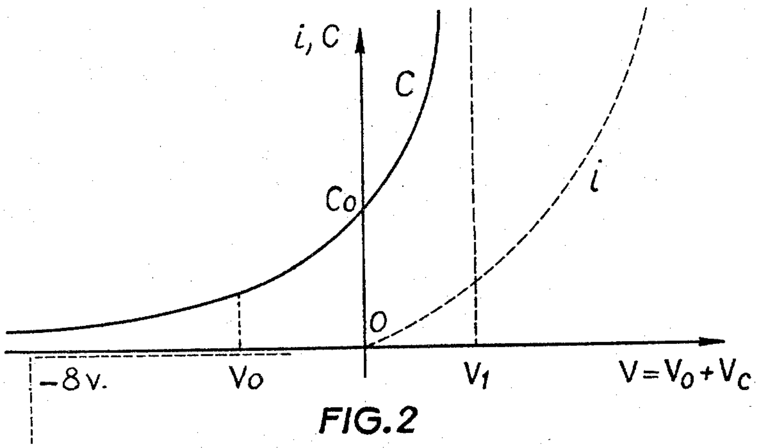
FIG. 2 is an explanatory graph.

FIG. 2 shows the variation of C as a function of the total voltage V, i.e. bias voltage $V_0$ plus control voltage $V_c$, applied to the diode, the sum of said two voltages being always such that the diode is always biased in the reverse direction. The graph also shows the variation of the current *i* flowing in the diode.

In one embodiment of the device, one had $C_0$ 4 $\mu\mu$f. and $V_1$ 0.4 volt.

Control voltage $V_c$ is low and voltage $V_0$ is preferably also made low, for example about −0.1 volt, and the slope of the curve giving C is of the order of 45° for $V=0$. If the control voltage $V_c$ is alternating, the peak value of $V_c$ should be taken equal to $V_0$. It may be seen that *i* is zero when $$0>V>-8 \text{ volts}$$

The peak value of the control voltage $V_c$ is then equal to 4 volts, voltage $V_0$ being equal to −4 volts.

Figure 3:
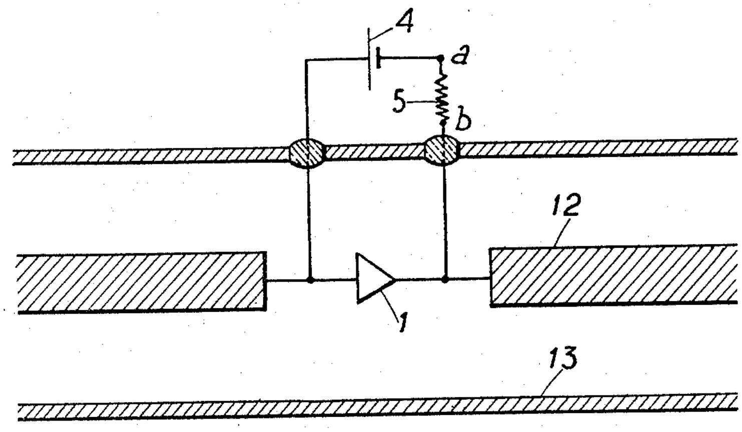
FIGS. 3 and 4 show other phase-shift arrangements according to the invention.

In FIG. 3 diode 1 is shown as inserted in the inner conductor 12 of a coaxial line having an outer conductor 13.

The remainder of the circuit is the same as in FIG. 1, the diode behaving as a capacity C, the value of which is given by formula $$C=C_0/\sqrt{(1-V/V_1)}$$

this being a series impedance.

The phase-shifts thus obtained are as follows:

(a) *Shunt Impedance (FIG. 1)*

$Z_0$ being the characteristic impedance of the line, and $Z_1$ being the impedance of the diode, it is known that the angle *u* of reflection against the obstacle built up by the diode is given by the formula:

$$-\frac{j}{2}\tan u=\frac{Z_1}{Z_0}$$

The phase-shift angle or the argument of the transmission coefficient is:

$$\varphi=\frac{3\pi}{2}+u$$

and thus:

$$\cot\varphi=-\tan u=-2\sqrt{(1-V/V_1)}/C_0Z_0\omega$$

The formula gives the phase-shift $\varphi$ for a fixed voltage $V_0$.

It will be assumed that the applied voltage V undergoes small variations $\Delta V$ about $V_0$, i.e. $V_0-\Delta V<V<V_0+\Delta V$, since $-\Delta V<V_c<+\Delta V$.

Then:

$$\Delta\varphi=\Delta u=\frac{2\Delta|z_1|}{1+4|z_1|^2},$$

where $z_1=Z_1/Z_c$, which assumes the value corresponding to voltage $V_0$.

(b) *Series Impedance (FIG. 3)*

The angle of reflection is given by the formula:

$$-2i.\cot v=z_1=Z_1/Z_c$$

$Z_1$ being the impedance of the diode.

The argument of the transmission coefficient or the phase-shift angle $\varphi$ is:

$$\varphi=\frac{\pi}{2}-V$$

$$\tan\varphi=\cot V=\frac{\sqrt{1-\frac{V}{V_1}}}{2C\omega Z_c}$$

for $$V_c=V_0+\Delta V$$

$$\Delta\Phi=-\Delta V_0=\frac{\Delta|z_i|}{2\left(1+\frac{|z_i|^2}{4}\right)}$$

It is readily seen that for the same value of $\Delta V_c$, the phase-shift angle $\Delta\varphi$ is greater for the series arrangement than for the parallel arrangement for $z_1<1$.

In the reverse case, i.e. for $z_1>1$, is greater in the parallel arrangement than in the series arrangement.

In both cases, the presence of such a diode in a transmission line results in standing waves. The standing-wave ratio depends upon the value $V_c$ and consequently on the phase-shift introduced and it is desirable to reduce this ratio.

Figure 4:
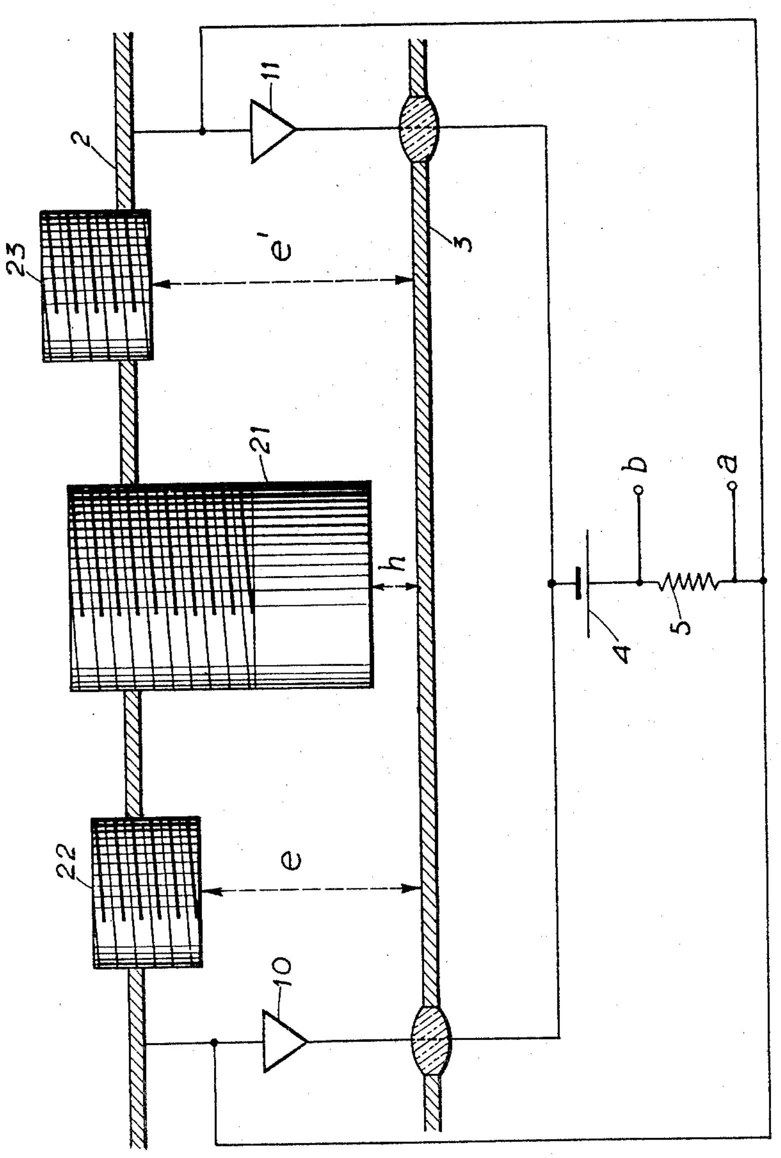

The arrangement illustrated in FIG. 4 avoids this drawback.

It comprises two similar diodes 10 and 11 of the same type as those of FIGS. 1 and 3. Diodes 10 and 11 are, in FIG. 4, connected between the opposite walls 2 and 3 of a wave-guide. They are fed in parallel from a common bias voltage source which delivers voltage $V_0$. The control voltage $V_c$ is applied to terminals *a* and *b* of a resistor 5. These two diodes are spaced from one another substantially by one wavelength, corresponding to the operating frequency.

Equally spaced from these two diodes is a plunger 21, the position of which is adjustable. Two further plungers 22 and 23 of the same type are located between plunger 21 and diodes 11 and 12 respectively.

The bottoms of plungers 22 and 23 are respectively spaced by distances *e* and *e'* from the guide wall 3.

The operation of the device is as follows: the distance *h* of the bottom of piston 21 from wall 3 is, for a given voltage $V_0$, adjusted so that the overall transmission coefficient be a maximum. Then distances *e* and *e'* are adjusted so that the coefficient of reflection on all the obstacles is stationary, i.e. passes through a minimum and a maximum for value $V_0$.

It can be then shown that, for small variations $\Delta V$ of $V_0$, this coefficient of reflection will be constant.

As to the phase-shift, it is the double of that obtained with a single diode.

Of course, the invention is not limited to the embodiments described and shown, which were given only by way of example.

What is claimed is:

1. In a high frequency transmission line having two conductors, a phase shifting device comprising two diodes separated substantially by one wavelength of the operating wave, respective means for applying a direct current voltage across said diodes for biasing said diodes in the reverse direction, means for applying in series with said biasing voltage a control voltage for controlling the phase shift introduced by said diodes, the sum of said two voltages being always such that the diode is always biased in the reverse direction, a first adjustable plunger equally spaced from said diodes, and two further adjustable plungers equally spaced between said first plunger and respectively said two diodes.

2. In a wave guide having two opposite walls a phase shifting device comprising two diodes coupled in series through one of said walls in parallel with respect to the other of said walls and separated substantially by one wavelength of the operating wave, respective means for applying a direct current voltage across said diodes for biasing said diodes in the reverse direction, means for applying in series with said biasing voltage a control voltage for controlling the phase shift introduced by said diodes, a first adjustable plunger extending through one of said walls and equally spaced from said diodes, and two further adjustable plungers equally spaced between said first plunger and respectively said two diodes and extending through said one wall.

References Cited in the file of this patent

UNITED STATES PATENTS 2,637,813 Braden ------------------ May 5, 1953

OTHER REFERENCES

Hardin: "Electronically-Variable hPase Shifters Utilizing Variable Capacitance Diodes," Proc. I.R.E., May 1960, pages 944–945.